United States Patent [19]

Hershberger

[11] Patent Number: 5,016,259
[45] Date of Patent: May 14, 1991

[54] LOW JITTER DDFS FSK MODULATOR

[75] Inventor: David L. Hershberger, Nevada City, Calif.

[73] Assignee: The Grass Valley Group, Inc., Nevada City, Calif.

[21] Appl. No.: 319,040

[22] Filed: Mar. 3, 1989

[51] Int. Cl.$^5$ .......................................... H04L 27/12
[52] U.S. Cl. ...................... 375/62; 375/118; 328/14
[58] Field of Search ............... 375/51, 61, 62, 65, 375/45, 48, 118, 120; 332/1, 9 R, 9 T, 11 R, 100, 101, 104, 117; 364/721, 718; 331/1 R; 328/14, 155

[56] References Cited

U.S. PATENT DOCUMENTS

| | | | |
|---|---|---|---|
| 3,636,477 | 1/1972 | Selz | 375/62 |
| 3,958,191 | 5/1976 | Jones, Jr. | 375/62 |
| 4,338,571 | 7/1982 | Young | 330/107 |
| 4,492,936 | 1/1985 | Albarello et al. | 375/62 |
| 4,618,966 | 10/1986 | Stepp et al. | 332/9 R |
| 4,628,286 | 12/1986 | Nossen | 332/100 |
| 4,670,888 | 6/1987 | Smith, III | 331/1 R |
| 4,682,123 | 7/1987 | Loper et al. | 332/9 R |
| 4,700,364 | 10/1987 | Miyazaki et al. | 375/51 |
| 4,852,124 | 7/1989 | Raucci | 375/120 |

Primary Examiner—Stephen Chin
Attorney, Agent, or Firm—Francis I. Gray; John Smith-Hill

[57] ABSTRACT

A low jitter direct digital frequency synthesized frequency shift keyed modulator has a tapped delay line to provide polyphase sampling of an asynchronous data input signal. The samples from the tapped delay line are input to a correction signal generator that produces a correction signal as a function of the location of data transitions in the data input signal with respect to a specified point of a sample clock pulse. The correction signal is used to offset a modulating input to a direct digital frequency synthesizer so that the frequency shift keyed output reflects the data transitions within 1/n of the period of the sample clock pulse.

8 Claims, 3 Drawing Sheets

LOW JITTER DDFS FSK MODULATOR

BACKGROUND OF THE INVENTION

The present invention relates to the transmission of data, and more particularly to a low jitter direct digital frequency synthesizer (DDFS) modulator for transmitting asynchronous data as a frequency modulated signal using frequency shift keying (FSK).

The direct digital method of producing frequency modulation has many advantages including crystal controlled accuracy and freedom from adjustment, drift and component aging. A simple method of using a direct digital frequency synthesizer to generate a frequency shift keyed output signal is to clock asynchronous data into a flip-flop, the clock frequency being much higher than the data frequency. An edge generator creates a transition signal that frequency modulates the DDFS, the edge generator being a digital lowpass filter that may produce a linear ramp, a raised cosine edge or some other transition such that the FSK spectrum is well contained. The problem with this approach is that, due to the sampling, up to one clock period of time jitter or uncertainty is introduced into the data signal. To reduce this jitter the clock frequency may be increased, but there is a practical limit to the amount the clock frequency may be increased.

Therefore what is desired is a method of producing a low jitter DDFS FSK modulator that determines the location of data transitions to a fraction of one clock period without using a higher clock frequency.

SUMMARY OF THE INVENTION

Accordingly the present invention provides a low jitter direct digital frequency synthesizer frequency shift keyed modulator for transmitting asynchronous data that determines the location of data transitions to a fraction of one clock period by using a tapped delay line. The input data signal is applied to the tapped delay line, with each tap inserting a delay of 1/n of the clock period. Whenever a data transition occurs close to a clock pulse edge, the timing of the tap outputs with regard to the nearest clock edge identifies the clock subinterval in which the transition occurred. An edge generator uses this information to develop a correction signal that is added to a transition ramp to determine the location of the data transition. The corrected data transition information is used to frequency shift key modulate a direct digital synthesized frequency to produce the frequency modulated signal for transmission.

The objects, advantages and other novel features of the present invention are apparent from the following detailed description when read in conjunction with the appended claims and attached drawing.

DESCRIPTION OF THE PREFERRED EMBODIMENT

Figure 1:
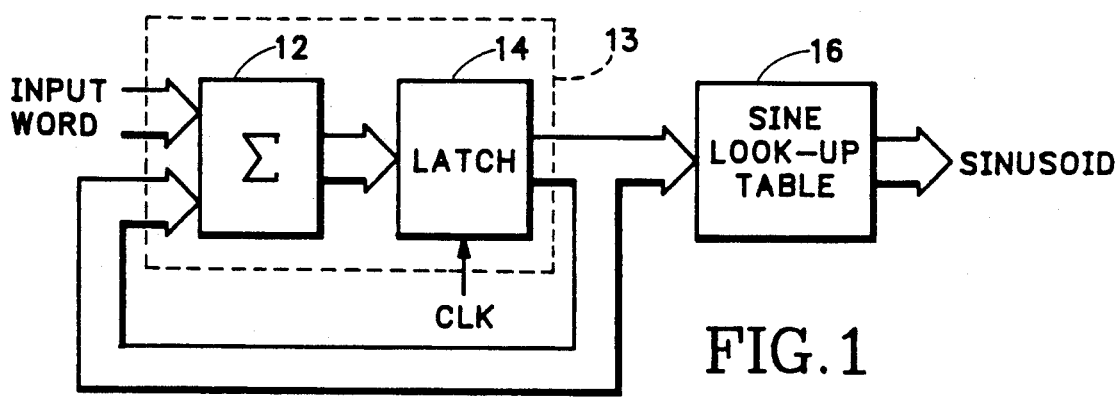
FIG. 1 is a simplified block diagram of a direct digital frequency synthesizer according to the present invention.

Referring now to FIG. 1 an input digital word, representing a desired carrier frequency, is input to an adder 12. The output of the adder 12 is clocked into a latch 14 by a system clock CLK. The output of the latch 14 is a ramp signal that serves as an address for a sine lookup table 16 that converts the ramp signal into a digital sinusoid. The output of the latch 14 also is fed back for input to the adder 12. If the latch 14 is set initially at zero, and if the input digital word also is zero, then nothing changes when the latch is clocked because zero plus zero equals zero. If the input digital word is changed to one, then the latch output changes to a one when it is clocked. The one circulates back to the adder 12 where it is summed with the existing one of the input digital word to produce a two, so that when the next clock pulse occurs the latch is set to two. Thus this circuit continuously increments as long as the input digital word is at least one. If the input digital word is changed to two, then the circuit counts up twice as fast. Eventually the latch 14 and/or adder 12 overflows and the count starts again. Therefore this circuit produces a digital ramp signal with a slope and frequency proportional to the numerical value of the input digital word. This latch/adder incrementing circuit forms an Euler integrator 13.

The ramp signal from the latch 14 is applied to the sine lookup table 16 that converts the ramp signal into a digital sinusoid. By controlling the numerical value of the input digital word, the frequency of the sinusoid is controlled. The frequency step size of this DDFS can be made very small simply by increasing the number of bits input to the latch 14, and the DDFS does not encounter a frequency modulation (FM) noise penalty. The number of input digital bits, integrator bits and sine table bits are all independent quantities. Overflow of the Euler integrator is designed to occur at the point where the sine lookup table repeats itself, resulting in a digital integrator of effectively infinite size corresponding to a phase modulator with unlimited range.

Figure 2:
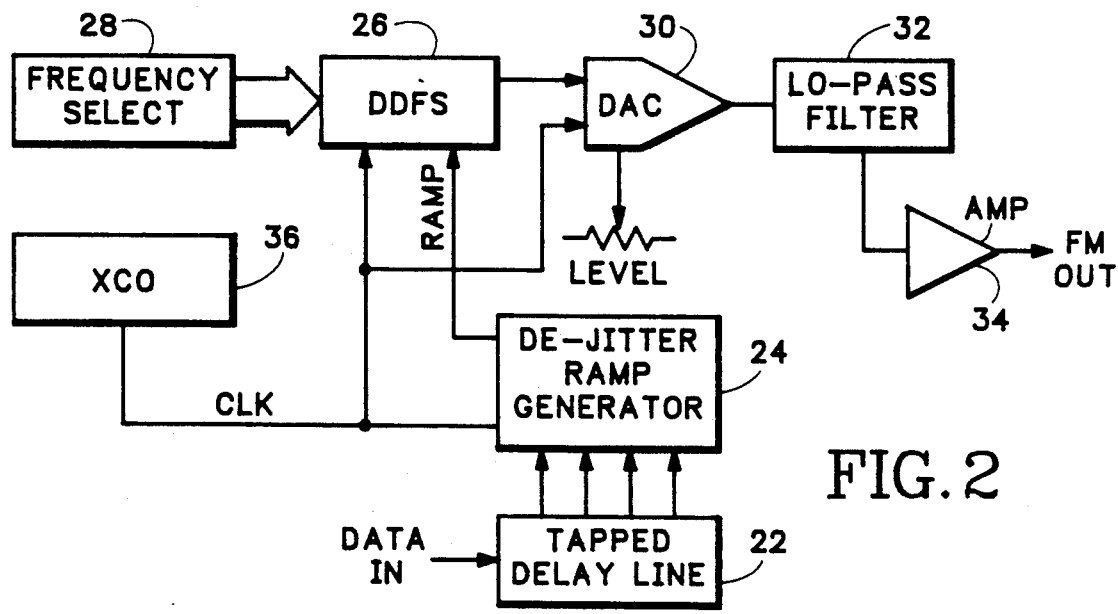
FIG. 2 is a block diagram of a low jitter DDFS FSK modulator according to the present invention.

If FSK were produced simply by toggling the input to the DDFS between two discrete values representing two discrete frequencies, the abrupt changes in frequency would generate large higher order sidebands, resulting in a subcarrier frequency spectrum so wide as to introduce jitter in adjacent data channels. Therefore the data pulse edges are shaped, or digitally low-pass filtered, before being applied to the frequency modulator. As shown in FIG. 2 the data signal is input to a tapped delay line 22 to produce respective delays of ¼ of a clock cycle, n being four, between taps. The n outputs of the tapped delay line 22 are input to a de-jitter ramp generator 24 that acts as a digital lowpass filter to shape the edges of the data signal. The ramp transition signal from the de-jitter ramp generator 24 is adjusted according to the clock interval from the tapped delay line 22 within which the data edge actually occurs. The ramp signal is input to a direct digital frequency synthesizer (DDFS) 26 having an input digital word from a frequency select circuit 28. The digital sinusoid from the DDFS 26 is input to a digital to analog converter (DAC) 30 to produce an analog FM FSK signal. The FM signal is input to a lowpass filter 32 and thence to an output amplifier 34 for transmission. Timing is provided by a crystal controlled oscillator (XCO) 36 that outputs a clock signal CLK to sample the data from the tapped delay line 22, to generate the ramp from the de-jitter ramp generator 24, to increment the integrator of the DDFS 26, and to drive the DAC 30.

Figure 3:
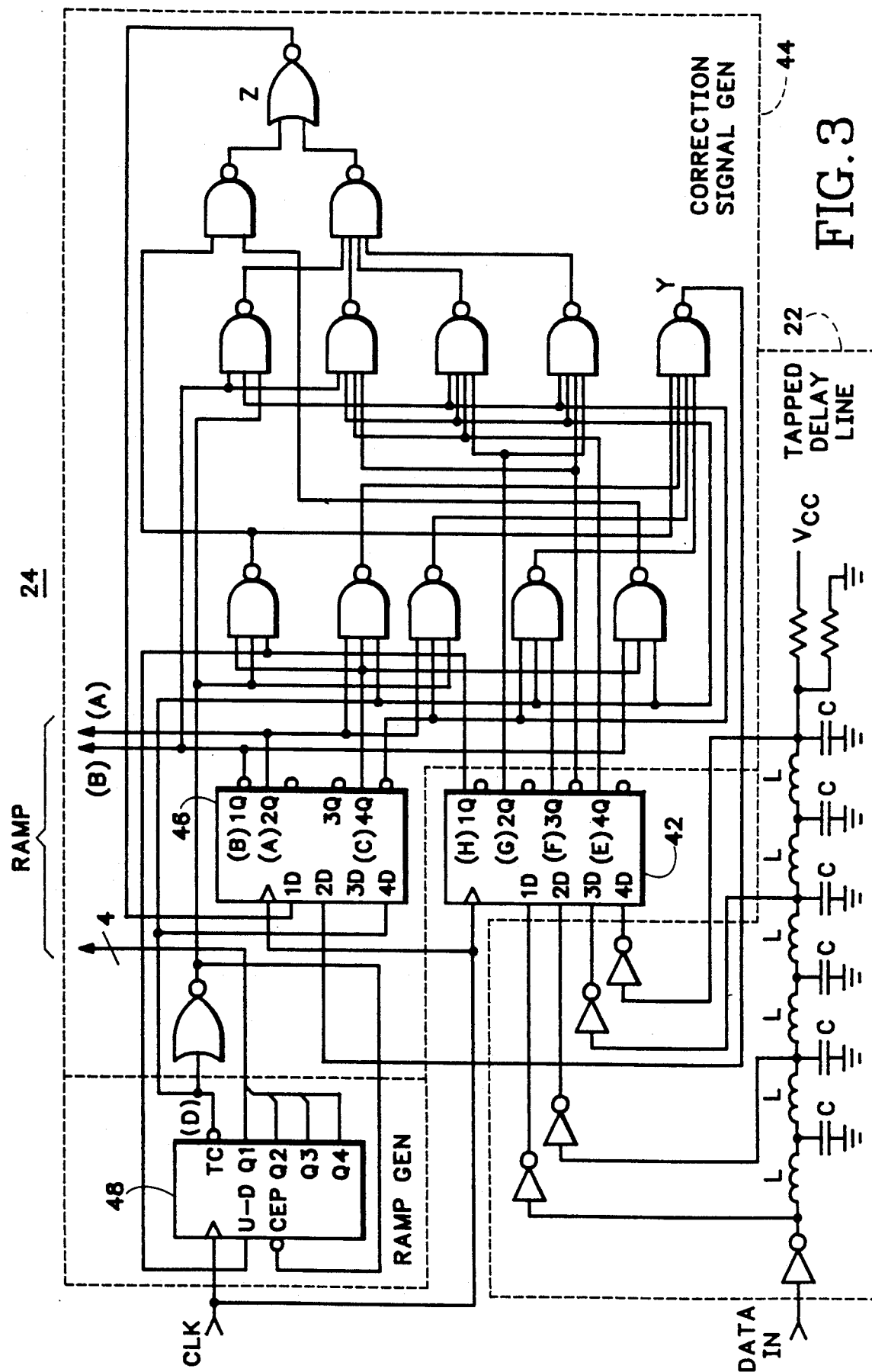
FIG. 3 is a schematic diagram of a de-jitter portion of the low jitter DDFS FSK modulator according to the present invention.

The tapped delay line 22, as shown in FIG. 3, is a series of inductors L connected between the input and a voltage potential, and having capacitors C connected between the junctions of the inductors and a ground potential. The amount of required delay and the values of the inductors L and capacitors C are a function of the clock frequency CLK, and each segment of the delay line 22 between taps is designed to produce a delay of $1/n$ times the period of the clock frequency, where $n=4$ for the circuit shown. The four outputs of the delay line 22 are input to a quad D-type flip-flop 42, i.e., four D-type flip-flops in parallel, that is clocked by CLK to sample the outputs. The outputs of the quad flip-flops 42 are input to a correction signal generator 44 that has a plurality of logic elements, such as NAND gates, NOR gates and flip-flops. The correction signal generator 44 identifies in which delay interval a data transition occurs and generates an appropriate two-bit correction value that is latched by two of the flip-flops of a second quad D-type flip-flop 46. The following truth table defines the correction signal generator 44:

| | | | | TRUTH | TABLE | | | | |
|---|---|---|---|---|---|---|---|---|---|
| A | B | C | D | E | F | G | H | Y | Z |
| — | — | 0 | 1 | 0 | 0 | 0 | 1, | 0 | 0 |
| — | — | 0 | 1 | 0 | 0 | 1 | 1, | 0 | 1 |
| — | — | 0 | 1 | 0 | 1 | 1 | 1, | 1 | 0 |
| — | — | 0 | 1 | 1 | 1 | 1 | 1, | 1 | 1 |
| — | — | 0 | 1 | 0 | 0 | 0 | 0, | 0 | 0 |
| — | — | 0 | 1 | 1 | 0 | 0 | 0, | 0 | 1 |
| — | — | 0 | 1 | 1 | 1 | 0 | 0, | 1 | 0 |
| — | — | 0 | 1 | 1 | 1 | 1 | 0, | 1 | 1 |
| — | — | 1 | 0 | — | — | — | 1, | 1 | 1 |
| — | — | 1 | 0 | — | — | — | 0, | 0 | 0 |
| 0 | 0 | 0 | 0 | — | — | — | —, | 0 | 0 |
| 0 | 1 | 0 | 0 | — | — | — | —, | 0 | 1 |
| 1 | 0 | 0 | 0 | — | — | — | —, | 1 | 0 |
| 1 | 1 | 0 | 0 | — | — | — | —, | 1 | 1 |
| 0 | 0 | 1 | 1 | — | — | — | —, | 0 | 0 |
| 0 | 1 | 1 | 1 | — | — | — | —, | 0 | 1 |
| 1 | 0 | 1 | 1 | — | — | — | —, | 1 | 0 |
| 1 | 1 | 1 | 1 | — | — | — | —, | 1 | 1 |
| — | — | 0 | 1 | 0 | 1 | 0 | 0, | X | X |
| — | — | 0 | 1 | 0 | 0 | 1 | 0, | X | X |
| — | — | 0 | 1 | 1 | 0 | 1 | 0, | X | X |
| — | — | 0 | 1 | 0 | 1 | 1 | 0, | X | X |
| — | — | 0 | 1 | 1 | 0 | 0 | 1, | X | X |
| — | — | 0 | 1 | 0 | 1 | 0 | 1, | X | X |
| — | — | 0 | 1 | 1 | 1 | 0 | 1, | X | X |
| — | — | 0 | 1 | 0 | 1 | 1 | 1, | X | X | where E, F, G and H represent the input data at terminals 4Q, 3Q, 2Q and 1Q of the input quad flip-flop 42; D and C represent the terminal count and delayed terminal count output of the up/down counter 48; Y and Z represent the bits of the two-bit correction signal from the output quad flip-flop 46; A and B represent the delayed bits of the two-bit correction signal from the output quad flip-flop 46; "-" represents a "don't care" for an input bit; and "X" represents a "don't care" for an output bit. During a zero to one transition of the input data, the counter 48 begins to count (C=0, D=1) and a correction signal is generated that is a function of which clock subinterval has the transition. Only one data transition per clock is allowed, and two or more transitions due to noise or illegal input data rates are treated as input "don't care" states. While the counter 48 is counting (C=1, D=1), the correction signal generated at the initial transition is held. Finally when the counter 48 reaches its terminal count (C=1, D=0), the correction signal is set to all ones. Operation during a one to zero transition is similar.

A ramp generator 48 in the form of an up/down counter receives the undelayed bit of the input data from the 1Q output of the sample quad flip-flops 42 to indicate whether the data is high or low in value. When the data transitions between pulses of CLK, the output at 1Q of quad flip-flops 42 changes state, which in turn changes the ramp generator 48 from an up to a down counter, or vice versa. The ramp generator 48 then counts the next fifteen clock pulses of CLK, with the count appearing at Q1-Q4 as a digital ramp, either counting up or down. When the count reaches all zeros or all ones, then the count stops and a terminal count TC logic zero is output from the ramp generator 48 to the correction signal generator 44.

Figure 4:
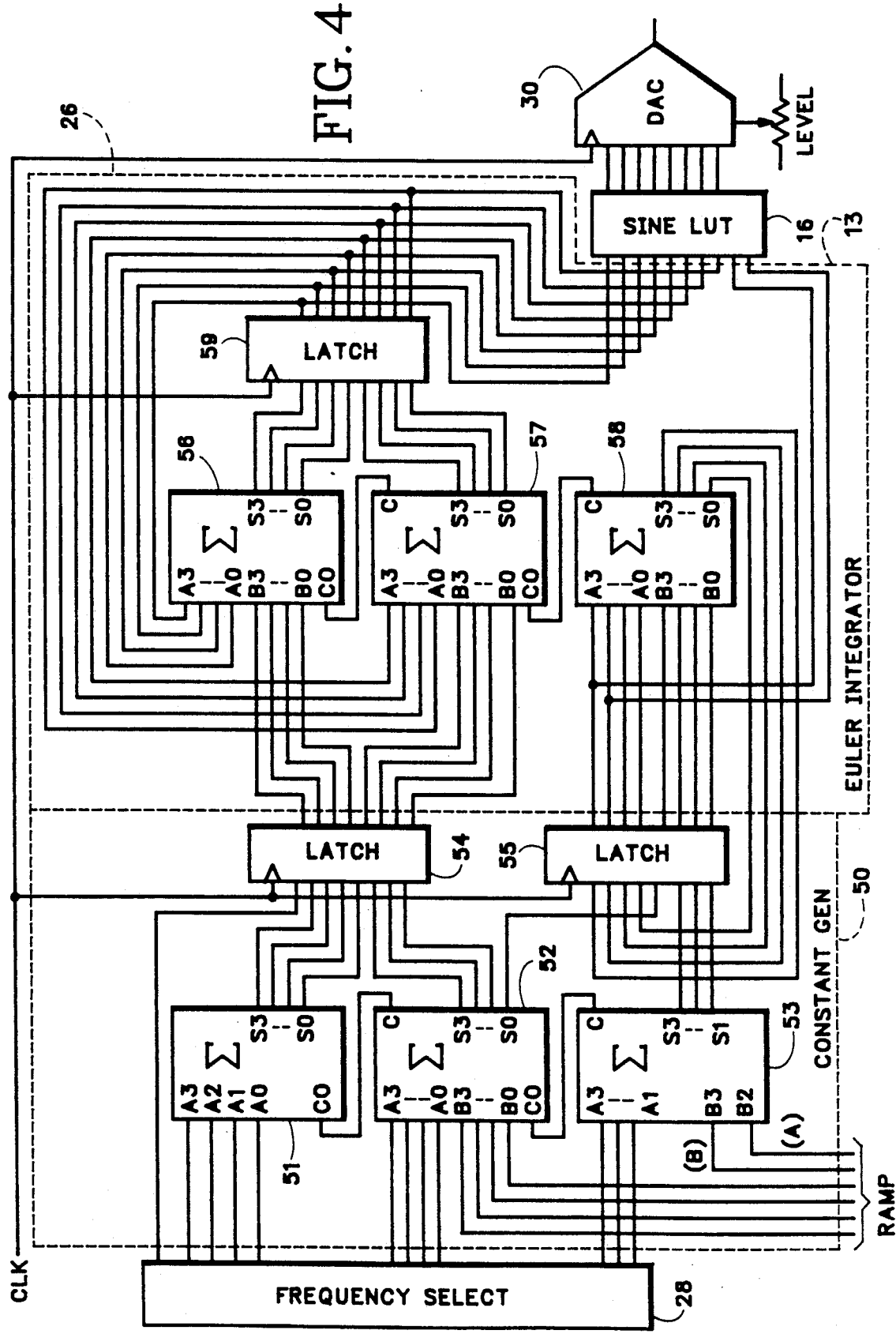
FIG. 4 is a schematic diagram of a DDFS portion of the low jitter DDFS FSK modulator according to the present invention.

Referring now to FIG. 4 the digital ramp from the ramp generator 48 and the correction signal from the correction signal generator 44 are input to the DDFS 26. At the input to the DDFS 26 the selected frequency, as indicated by the input digital word from the frequency select circuit 28, is added to the digital ramp plus correction signal in adders 51-53, which form an input digital word generator 50 for the DDFS. The input digital word is latched by the clock CLK in latches 54-55 for input to the Euler integrator 13. Adders 56-58 form the adder 12 of FIG. 1, and latch 59 together with a portion of latch 55 form the latch 14 of FIG. 1 so that the sum from the adders is recirculated back to the inputs. The outputs from latch 59 and two bits from latch 55 form the address for the sine lookup table 16, and the eight bits from the sine lookup table are converted to the FSK signal by the DAC 30.

Figure 5:
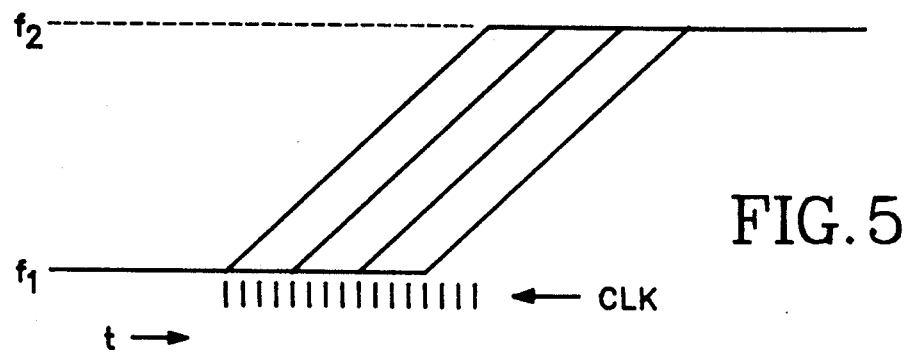
FIG. 5 is a waveform diagram representing the effective edge transition input to the DDFS portion of the low jitter DDFS FSK modulator according to the present invention.

In operation an operator selects a subcarrier frequency with the frequency select circuit 28. As data is received, the input digital word representing the selected frequency is incremented by the digital ramp with the correction signal from the ramp generator 48 and the correction signal generator 44 when the data transitions from a low to a high data level, for example, to provide a gradual transition from the selected subcarrier, representing one data level, to another frequency offset from the subcarrier frequency, representing the other data level. The correction signal provides an offset to the ramp signal, as shown in FIG. 5, so that the ramp at the data transition is moved with respect to the clock pulse in 1/n time increments of the clock period. The result is an FSK output signal that has a lower time jitter than the clock sample interval. For example, a 20 MHz sample clock provides a sample interval of 50 nsecs., resulting in up to that amount of time jitter for any data transition, while that jitter is reduced by the de-jitter ramp generator 24 of the present invention to 12.5 nsecs. without increasing the sample clock frequency.

Thus the present invention provides a low jitter DDFS FSK modulator for an asynchronous data input at a given sample clock frequency by using a polyphase sampling approach to offset a ramp signal that is used to generate the FSK modulation of a subcarrier frequency.

What is claimed is:

1. An apparatus for reducing jitter in the data transitions of an asynchronous data input where such data transitions occur at intervals NT, where N is an integer greater than zero, said apparatus comprising:
   means for generating a sample clock having a period t shorter than T,
   means for sampling the data input at intervals t/n, wherein is an integer greater than unity, to produce n samples of the data input during each sample clock period;
   means for generating a correction signal from the sampled data input as a function of the location of the data transitions within the sample clock period relative to one edge of the sample clock pulse; and
   means for offsetting a digital ramp signal representing the data transitions by the correction signal.

2. An apparatus as recited in claim 1 wherein the sampling means comprises:
   a tapped delay line having taps located at delay time intervals equal to 1/n times the period of the sample clock pulse to provide n outputs; and
   means for sampling the n outputs at a specified time relative to the sample clock pulse to produce the n samples.

3. An apparatus as recited in claim 1 wherein the generating means comprises:
   means for determining from the n samples the location of the data transitions relative to one edge of the sample clock pulse; and
   means for generating the correction signal from the location of the data transitions.

4. An apparatus as recited in claim 1 wherein the offsetting means comprises:
   means for generating the digital ramp signal in response to the data transitions; and
   means for adding the correction signal to the digital ramp signal.

5. An improved direct digital frequency synthesized frequency shift keyed modulator of the type having a sine lookup table to output a digital sinusoid and a ramp generator to provide a modulating input that changes the constant value input when there are transitions in data input, the improvement comprising:
   means for polyphase sampling the data input to produce n samples for each sample clock pulse;
   means for generating a correction signal as a function of the data transitions as represented by the n samples;
   means for offsetting the modulating input by the correction signal so that the change to the constant value input is closer in time to the data transitions; and
   means for integrating said constant value input and feeding the result into the sine lookup table using a Euler integrator.

6. An improved direct digital frequency synthesized frequency shift keyed modulator as recited in claim 5 wherein the polyphase sampling means comprises:
   a tapped delay line having taps located at delay time intervals equal to 1/n times the period of the sample clock pulse to provide n outputs; and
   means for sampling the n outputs substantially simultaneously to produce the n samples.

7. An improved direct digital frequency synthesized frequency shift keyed modulator as recited in claim 5 wherein the generating means comprises:
   means for determining from the n samples the location of the data transitions relative to one edge of the sample clock pulse; and
   means for generating the correction signal from the location of the data transitions.

8. An improved direct digital frequency synthesized frequency shift keyed modulator as recited in claim 5 wherein the offsetting means comprises:
   means for generating a digital ramp signal in response to the data transitions; and
   means for adding the correction signal to the digital ramp signal.

* * * * *